May 2, 1961 R. E. CROSS ET AL 2,982,157
MULTIPLE STATION MACHINE TOOL
Filed March 28, 1957 5 Sheets-Sheet 1

INVENTORS.
Ralph E. Cross
Kurt O. Tech
BY
Harness, Dickey & Pierce
ATTORNEYS.

United States Patent Office 2,982,157
Patented May 2, 1961

2,982,157

MULTIPLE STATION MACHINE TOOL

Ralph E. Cross, Grosse Pointe Shores, and Kurt O. Tech, East Detroit, Mich., assignors to The Cross Company, Fraser, Mich., a corporation of Michigan Filed Mar. 28, 1957, Ser. No. 649,144

7 Claims. (Cl. 77—3)

This invention relates to multiple-station machine tools and more particularly to means for improving the precision with which such machine tools perform their machining operations.

The machine tolerance which can be maintained with multiple-station machine tool equipment is normally limited by the variations from nominal size of a plurality of elements of the machine tool. These variations arise both in the initial manufacture of the machine-tool elements and from the wear of those elements over the course of the life of the machine tool. The present invention pertains to the reduction of such variations.

The principles of the invention are representatively embodied in a multiple-station machine tool in which workpieces are transported by work-piece-holding pallets from one to another of a plurality of work stations. Each pallet includes spindle and clamping or holding means for rotatably supporting one or more workpieces, with the axis of rotation of each workpiece extending transversely of the line of interstation pallet movement.

To best illustrate the advantages which accrue from the practice of certain of the principles of the invention, equipment is disclosed for performing machining operations on the surface of a workpiece, it being assumed that it is requisite that the contour of the surface be accurately related to one face of the workpiece and to the longitudinal axis of the workpiece. To secure these relationships, the workpiece is initially accurately positioned with reference to the pallet and the pallet is then advanced to a position adjacent the cutting tool, means being provided to so locate the pallet that the axis of the workpiece and the cutting point of the cutting tool are accurately interrelated in one dimension, as representatively accomplished by adjusting the position of the workpiece along the direction of interstation pallet movement. Means are then actuated to move the pallet a short distance transversely of the line of interstation pallet movement until the pallet or the workpiece engages precision-machined locating buttons secured to the bed or base, thereby accurately establishing the distance, along the longitudinal axis of the workpiece, between the initial position of the cutting tool and a reference surface on the workpiece.

To establish an accurate relationship between the axis of relative rotation of the workpiece and the cutting tool in a vertical sense, the cutting tool is initially positioned, in the disclosed representative arrangement, so that its cutting point is a short distance away from its proper cutting position with respect to the workpiece in a dimension perpendicular to those of the above-noted adjustments. In the disclosed arrangement, the cutting point is above its proper cutting position. With the workpiece accurately positioned, the cutting tool is then moved downwardly, by automatic means, until a sensing device carried with the tool engages a reference surface on the workpiece or the pallet, terminating movement of the cutting tool at the proper position. Means are also disclosed for performing the foregoing positioning operations where plural workpieces are carried by a single pallet.

To illustrate the advantages which accrue from the practice of other principles of the invention, equipment is disclosed for drilling or reaming a hole the axis of which is perpendicular to the axis of the workpiece. After the pallet is located and clamped in position, the cutting tool is moved in a direction parallel with the axis of the workpiece to a preselected longitudinal position with respect to a reference surface of the workpiece. Concurrently with this movement, other means are effective to shift or adjust the cutting tool transversely so as to bring its axis into alignment with the longitudinal axis of the workpiece. Where the pallet carries a plurality of workpieces, with an individual cutting tool being provided for each such workpiece, it is contemplated that a single means be provided for moving or adjusting all of the cutting tools relative to the workpieces, with additional means being provided to permit each tool to adjust to its proper position, both longitudinally and transversely, independently of the other tools.

The nature of the invention will be more fully understood from the following detailed description of an embodiment of the invention when read with reference to the accompanying drawings in which.

Certain of the features herein disclosed are also disclosed and claimed in the patent application of Ralph E. Cross, entitled "Machine" Serial No. 649,236 and filed March 28, 1957, and the disclosure of that application is incorporated herein by reference. Additionally, certain of the principles of the present invention may be applied to a machine tool of the type disclosed in that application.

The principles of the present invention are also applicable to a machine tool of the type disclosed in patent 2,745,167, granted May 15, 1956 to R. E. Cross, and the disclosure of that patent is hereby incorporated by reference in the present application. The machine of that patent is shown to include a loading and unloading station, a plurality of work stations and conveyor means for transporting the workpieces, carried upon pallets, from one to the other of those work stations and from the final work station back to the unloading and loading station. The machine tool of the present invention may be considered to operate upon the same basis.

In accordance with the disclosure of the above-noted

Patent 2,745,167, a base 10, (Fig. 2A) supports rails or ways 12 and 14, extending the length of the machine tool. A plurality of workpieces 16 are supported by each of a plurality of workpiece supporting pallets 18. Each pallet 18 includes a pair of runners 20 and 22 having machined lower surfaces 24 and 26, respectively, adapted to engage the upper surfaces of rails 12 and 14, and depending vertically disposed lip surfaces 28 and 30, respectively, the spacing between which is but slightly greater than the distance between the outside vertical surfaces of the rails 12 and 14 for purposes to be noted. Means such as a transfer bar 32, of the nature of that disclosed in Patent 2,745,167, are provided for advancing the pallets 18 from station to station in the machine tool.

Figure 2A:
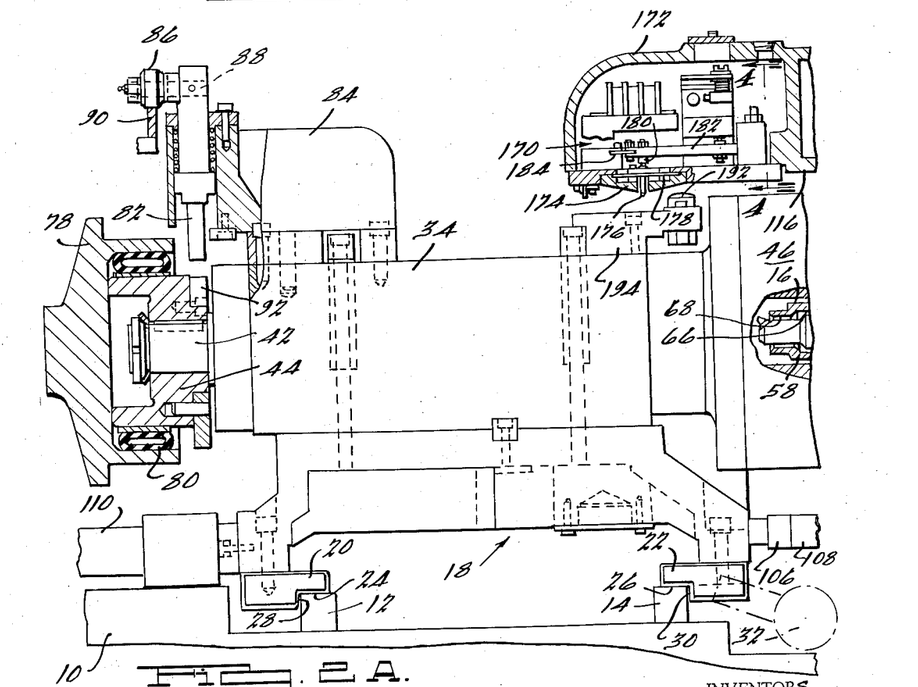
Fig. 2A is a fragmentary view of the left-hand portion of a sectional view taken substantially along the line 2—2 of Fig. 1.
Figures 2B, 4:
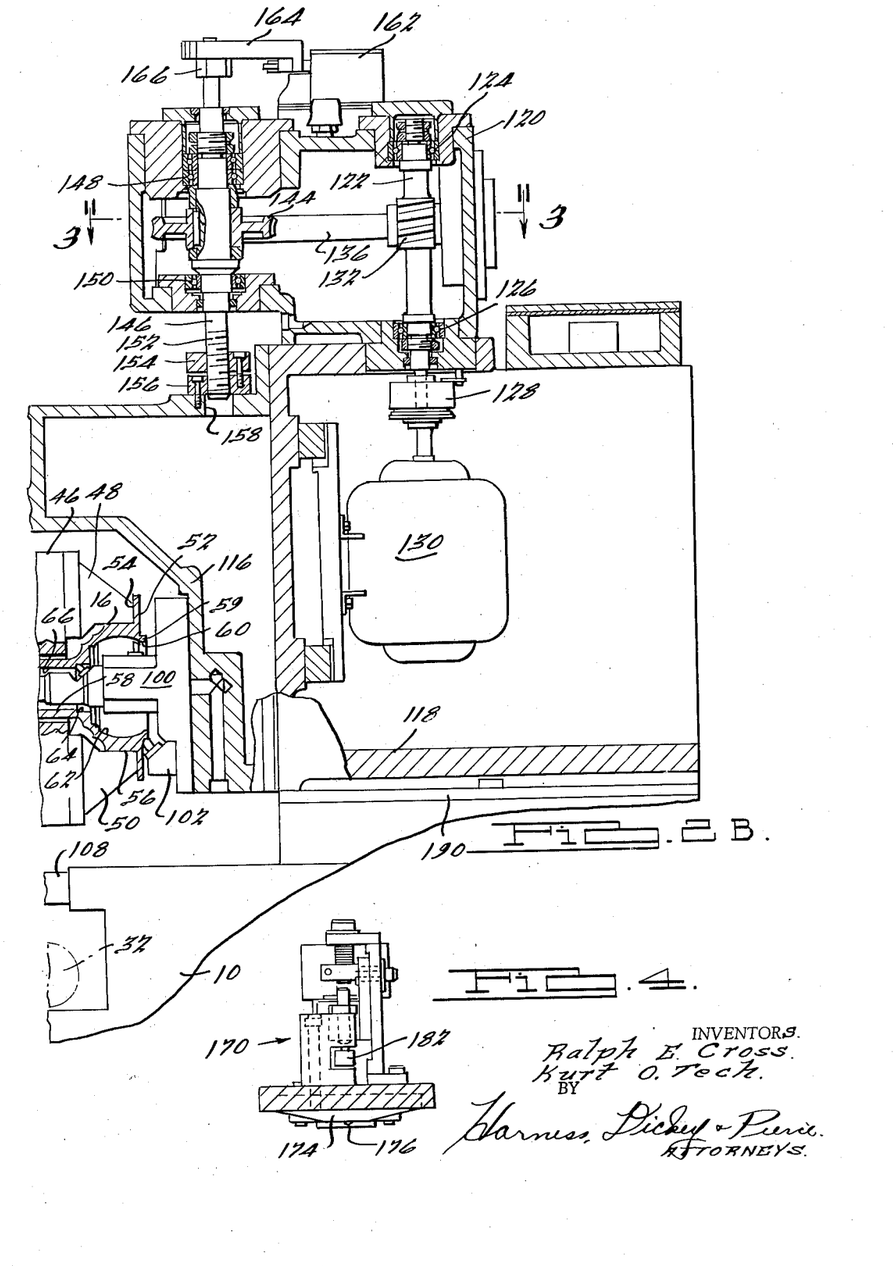
Fig. 2B is a fragmentary view of the right-hand portion of a sectional view taken substantially along the line 2—2 of Fig. 1, Fig. 2B being placed to the right of Fig. 2A for proper orientation.
Fig. 4 is a vertical sectional view taken substantially along the line 4—4 of Fig. 2A of the drawings.

Each pallet 18 carries a plurality of tubular housings 34, 36, 38 and 40 (Fig. 6) disposed in spaced parallelism with one another and with their longitudinal axes extending perpendicularly to the axes of the rails 12 and 14 and hence transversely of the line of interstation pallet movement. Each housing, such as housing 34, rotatably supports a spindle 42 (Fig. 2A). Each such spindle terminates at one end (the left-hand end in the view of Fig. 2A) in a driving hub 44 and supports, at the other end, a chuck 46 having a plurality of jaws including jaws 48 and 50 (Fig. 2B).

The generally bell-shaped differential gear cases which are representatively disclosed as the workpieces 16 (Figs. 2A and 2B) include a front flange having a forward face 52 and a rear face 54, a generally cylindrical exterior surface 56 adjacent the front flange, and a tail portion 58. The outer cylindrical surface of a lip 59 projecting from the front flange is machined at one point in the operations and, if desired, the forward face 52 may be machined to facilitate certain succeeding operations. Interiorly, workpiece 16 has a generally cylindrical surface 60 formed by the lip 59, a spherical inner surface 62 (the equipment for machining which is not detailed in the drawings) and successive generally cylindrical surfaces 64, 66 and 68.

In accordance with the principles of the aforesaid patent and application, it is assumed that each of the workpieces is to be rotated as an incident of the machining operations at certain of the work stations, and in accordance with the principles of the aforesaid application, it is assumed that the workpiece must be held against rotational motion at others of the work stations.

Figure 6:
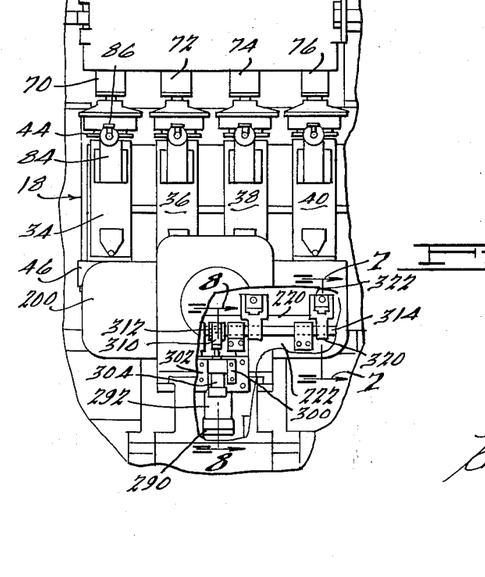
Fig. 6 is a top plan view of another portion of the machine tool embodying the principles of the present invention.

Driving means individual to each of the housings 34, 36, 38 and 40 are provided at each work station, such as driving means 70, 72, 74 and 76 illustrated in Fig. 6 of the drawings. Any suitable driving means may be employed, but at those stations at which the workpieces are to be held stationary, the driving means should either be in the nature of hydraulic or pneumatic motors or should otherwise be provided with the capability of slipping after they have positioned the workpieces.

Each driving means carries a driving member 78 (Fig. 2A) upon the inner cylindrical surface of which is mounted a reinforced pneumatically inflatable tube 80 adapted to engage the exterior of the driving hub 44 so that the elements including hub 44 and member 78 constitute a driving coupler. Appropriate means, such as a hydraulic cylinder, are provided for advancing and retracting the driving member 78 along its longitudinal axis to bring it into and from engagement with the driving hub 44.

A spring loader plunger 82 (Fig. 2A) is supported by a bracket 84 secured to the upper surface of each of the housings, such as housing 34. The position of each plunger 82 is determined by a cam follower roller 86 rotatably supported upon a shaft 88 which is secured integrally with the plunger 82. At any station at which the workpiece is to be rotated as an incident of the machining operation, a camming bar 90 is mounted and positioned so as to engage the cam follower roller 86 and elevate the locking plunger 82, as is illustrated in Fig. 2A of the drawings. At any station at which the workpiece is to be locked against rotation in a preselected rotational position, no camming bar 90 is provided. In the absence of a camming bar 90, locking plunger 82 is permitted to move downwardly in response to the force exerted by its individual spring and into engagement with a single peripheral recess or socket 92 in the driving hub 44, the driving means at that station serving as a positioner to rotate the driving hub 44 until the recess 92 is in alignment with locking plunger 82, at which time the plunger enters the recess and prevents further rotational motion of the workpiece. This feature is more fully disclosed in the above-noted patent application.

Figure 1:
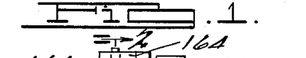
Fig. 1 is a fragmentary front elevational view of a portion of a machine tool embodying the principles of the present invention.

At the portion of the machine tool illustrated in Figs. 1, 2A and 2B of the drawings, a plurality of boring tools 100 (Fig. 2B) are to be advanced inwardly (to the left in Figs. 2A and 2B) along the longitudinal axis of each of the several workpieces 16 to form the surfaces 60, 64 and 68, and the outer surface of the lip 59. It is particularly important in this operation that the cutting points of the cutting tools be accurately located with respect to the axes of the several workpieces 16. It may also be important that the workpieces 16 be positioned along their longitudinal axes in precise relationship to the initial position of those cutting tools.

While adequate positional accuracy may accrue from the engagement between the runners 20 and 22 and the rails 12 and 14 (Fig. 2A), the precision of such positioning is limited not only by construction tolerances but also by the requirement that runners 20 and 22 move longitudinally along the rails 12 and 14 and by the fact that these sliding parts tend to wear over the course of the life of the machine tool. Therefore, in the illustrated arrangement, a pair of mating positioning or stop buttons 106 and 108 are mounted upon the pallet 18 and upon the base 10, respectively, and one other pair of mating positioning buttons may be and preferably is provided to insure parallelism and to prevent cocking.

In the preferred arrangement, immediately the pallet is brought to the station and its forward motion terminated, an automatically actuated locating pin is brought into engagement with a locating recess or socket in the pallet. A suitable manner of actuating such pins is detailed in the above-identified patent and application. As will be seen, the pallet is or may be moved, after such positioning, in a direction transverse of the axes of the rails (and hence perpendicular to the line of interstation article movement) into a precisely located position relative to the cutting tools.

To permit the adjustment and yet hold the pallet in preselected accurate relationship with the cutting tools in the direction of the pallet's interstation movement, the cooperating pin and socket should be other than circular. While a recess which accurately accepts the pin in one dimension and is elongated in the other offers a satisfactory solution, a different arrangement has been found to be advantageous in practice. An accurate circular cylindrical recess is formed in the pallet and the pin is conformed so as to engage the recess only along opposed lines. In a preferred arrangement, the pin is in the nature of a plate with sharpened edges, those edges being parallel and spaced apart a distance but slightly less than the diameter of the recess in the pallet, the two edges lying in a plane which is parallel with the line of interstation pallet movement. If the plate is, for example, a thousandth of an inch smaller than the recess, the pallet will be located, within that tolerance, in the direction of interstation travel, but will be free to move, with reasonable recess diameters, several thousandths of an inch in a direction perpendicular to the axis of the pin and perpendicular to the direction of interstation movement.

After the pallet 18 has arrived at the work station and after the locating pin has been seated in the locating recess in the pallet, a hydraulic cylinder 110, acting between the pallet 18 and the base 10 (or parts integral therewith), is actuated to bring the plurality of pairs of mating stop buttons, such as stop buttons 106 and 108, into abutment with one another and to hold them in such abutment during the course of the machining operation. It will now be clear that sufficient clearance must be established between the runners 20 and 22 and the rails 12 and 14 so that engagement between runner 20 and rail 12 will not prevent the stop buttons from coming into abutment with one another.

It is also contemplated that the longitudinal position of the workpieces may alternatively be established by mounting sensing devices on the machine in a position to engage a portion of the right-hand faces of the workpieces 16.

As may best be seen in Fig. 2B of the drawings, the tools generally designated 100 and 102 are mounted upon a tool slide 116. Slide 116 is slidably mounted upon a casting 118 so that it cannot move in any horizontal direction with respect to that casting but is free to slide, under the control of mechanism to be described, along and relative to the forward face of that casting.

Figure 3:
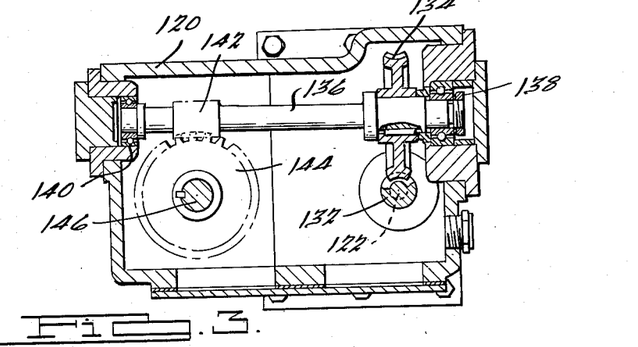
Fig. 3 is a sectional view taken substantially along the line 3—3 of Fig. 2B of the drawings.

Casting 118, slidably supported upon the base 10 (Figs. 1 and 2B), in turn supports a gear housing 120. A shaft 122, supported by bearings 124 and 126, is driven through a clutch 128, representatively an electric clutch, by a motor 130 mounted upon the casting 118. A worm 132 on shaft 122 engages a worm gear 134 which is (Fig. 3) mounted upon a shaft 136 supported in bearings 138 and 140 mounted in the side walls of gear housing 120. Worm 142 meshes with a worm gear 144 keyed to a shaft 146 which is rotatably supported relatively to the gear housing 120 by bearings 148 and 150 (Fig. 2B). The threaded lower end portion 152 of the shaft 146 threadedly engages nuts 154 and 156, screwed or otherwise secured together and to the slide 116, an aperture 158 being formed in the upper surface of slide 116 to accept the projecting end of shaft 146. It will be perceived that with the gear reduction provided by the gear train in housing 120, the position of the slide 116 relative to the casting 118 may be very precisely controlled.

In the disclosed arrangement, the magnitude of the relative vertical movement between slide 116 and casting 118 is relatively small since it is assumed that the several parts of the machine tool are formed with sufficient precision so that but minor positional adjutment is required. In practice, the total magnitude of adjustment may require that shaft 146 be rotated but a fraction of a full revolution.

Figure 5:
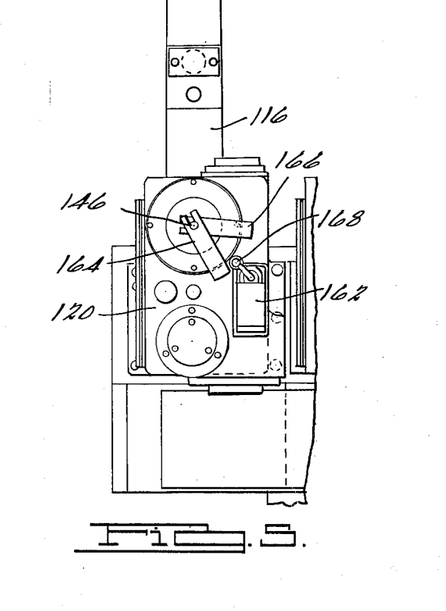
Fig. 5 is a fragmentary top plan view of the portion of the machine tool illustrated in Fig. 1 of the drawings.

To establish the uppermost position of the slide 116 relative to the casting 118 and to establish a limit to the downward motion of that slide, a limit switch 162 (Figs. 1, 2B and 5) is mounted upon the gear housing 120. A pair of cam arms 164 and 166 are secured in selected rotational positions to the upper end of shaft 146 so as to be rotated thereby. When motor 130 is rotated in a direction to elevate the slide 116, shaft 146 rotates until cam arm 164 engages and trips the actuating lever 163 of switch 162, terminating, through clutch 128, the driving of the shaft 146 and the upward motion of the slide 116. When the workpiece is in position, as signaled, for example, by limit switches, motor 130 rotates shaft 146 in a direction to lower the slide 116 and to move the cam arm 166 in a clockwise direction in the view of Fig. 5. In normal operation, sensing means to be described will terminate the downward motion. However, in the event that no signal is received from the sensing means prior to an established limit position, cam arm 166 will strike and trip actuating lever 168 to terminate the downward motion at that point.

The position-sensing switch 170 (Figs. 2A and 4) is supported within a switch housing 172 secured to the tool slide 116. Switch 170 includes an apertured base portion 174 through which a sensing or actuating finger 176 projects. Finger 176 is supported in any suitable manner, such as by a diaphragm 178, and its upper end engages a button 180 mounted upon a lever 182 at a point spaced from the spring hinge 184 supporting that lever. Upward movement of the non-hinged end of lever 182 controls the switch contacts to transmit a sensing signal.

Casting 118, motor 130, slide 116 and gear housing 120, and each of the other of the plurality of such assemblies at the work station are slidably disposed upon ways 190 on the base 10. Means such as hydraulic cylinders (not shown) are provided for advancing these assemblies, including the several sets of tools 100 and 102, toward the left in the view of Fig. 2B to advance the cutting tools into the workpieces as the workpieces rotate. When these units are in their rearmost precisely fixed positions (to the right in the view of Fig. 2B) and when the workpieces 16 are in the position determined by the several stop buttons including stop buttons 106 and 108, the several sensing fingers 176 are in vertical alignment with locating buttons secured to each of the housings 34, 36, 38 and 40, such as locating button 192 supported by bracket 194 on the upper surface of housing 34 (Fig. 2A). Each of the slides, such as slide 116 carrying tools 100 and 102 and switch housing 172, is lowered under the control of its motor 130 until the sensing finger 176 engages the button 192, the occurrence of which will immediately terminate the downward motion of the slide. With appropriate adjustments of the parts, it will thereby be insured that the cutting points of the several cutting tools such as 100 and 102 will be in correct relationship, in a vertical sense, with the axes of the individual workpieces 16. By providing a number of control and sensing means equal to the number of workpieces at the station, such alignment will be secured for each workpiece even though there be minor misalignments among the longitudinal axes of the several workpieces. The disclosed means will also, of course, compensate for variations among the successive pallets.

With the several driving couplers actuated to rotate the workpieces 16 about their longitudinal axes, the castings 118 and parts carried thereby are advanced to the left in the views of Figs. 2A and 2B to machine each of the several surfaces 60, 64 and 68 and the outer surfaces of lips 59. At the completion of this operation, the castings 118, and parts carried thereby, are moved back to the right to withdraw the several cutting tools 100 and 102 from the several workpieces 16, following which the slides 116 are elevated the pneumatic tubes 80 (Fig. 2A) are deflated and the driving members are withdrawn, and the hydraulic cylinder 110 and the locating pins are retracted so that conditions are established for permitting pallet 18 to be moved by transfer bar 32 to another work station.

It will be observed that the workpiece and the cutting tools are rotated relative to one another about the longitudinal axis of the workpiece, that the cutting tools are moved in a direction perpendicular to that axis of rotation to a preselected position and that cutting is accomplished by thereafter moving the cutting tools in a direction parallel with and along the axis of rotation. The preselected position is attained by the use of a tool-carrying slide as a positioning means, the tool being moved towards the workpiece until the sensing switch engages the button 192. Button 192 is, of course, effectively fixed with respect to the axis of the workpiece since the button is spaced a fixed distance from the chuck and its axis and since the workpiece is engaged by the jaws of the chuck, with the tips of those jaws engaging the surface 54 of the front flange, as above noted. It is contemplated that the sensing switch could also engage some other surface which is effectively fixed with respect to the axis of the workpiece, such as a surface of the workpiece itself.

Figure 7:
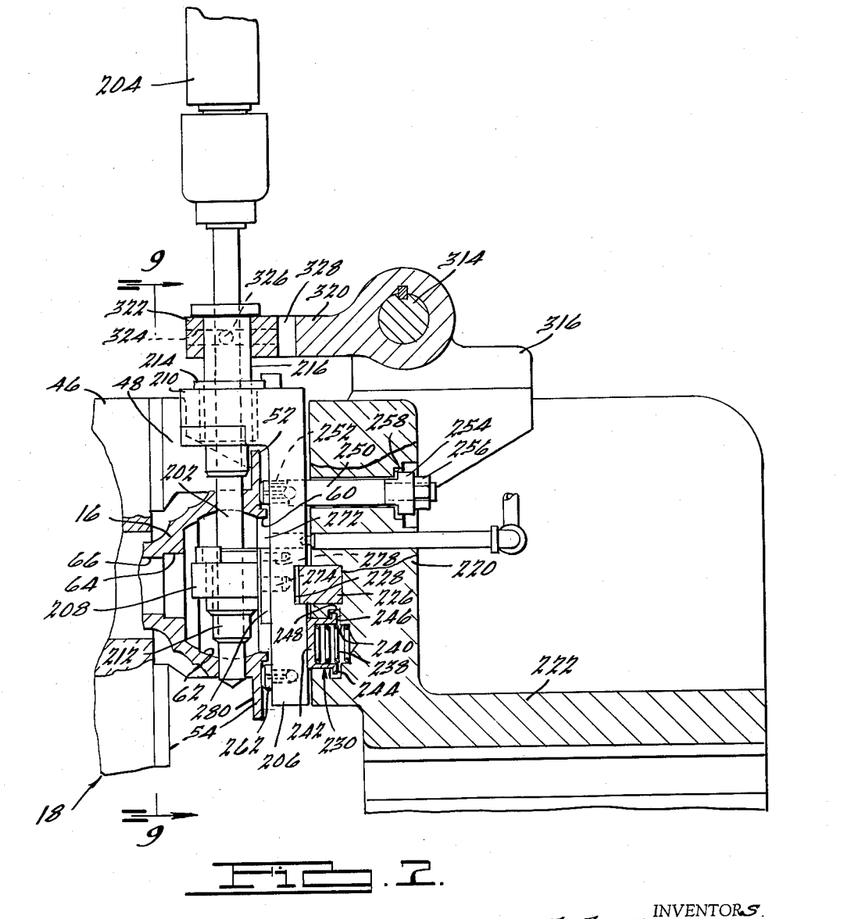
Fig. 7 is a sectional view taken substantially along the line 7—7 of Fig. 6 of the drawings.
Figure 8:
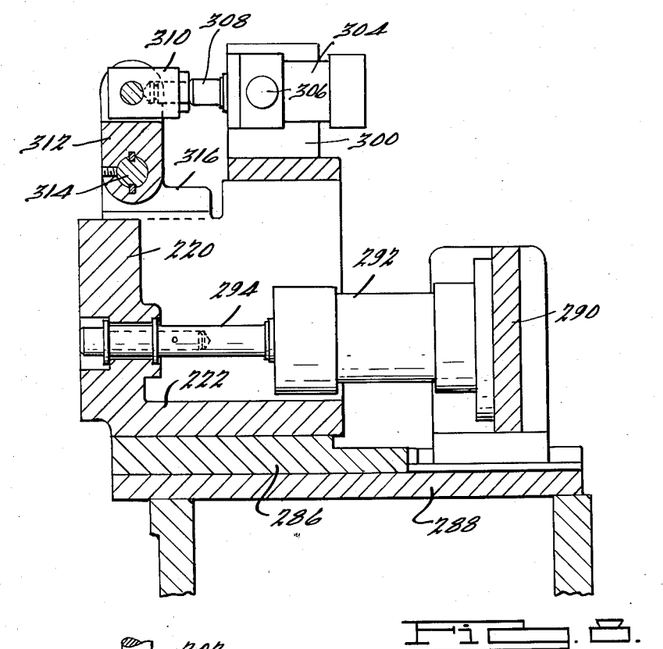
Fig. 8 is a sectional view taken substantially along the line 8—8 of Fig. 6 of the drawings.
Figure 9:
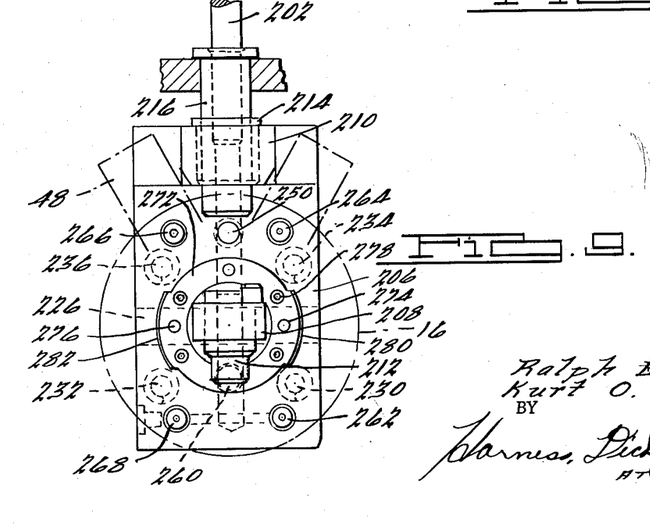
Fig. 9 is a sectional view taken substantially along the line 9—9 of Fig. 7 of the drawings, with the workpiece and chuck removed.

At the succeeding portion of the machine tool illustrated in Fig. 6 of the drawings, and further detailed in Figs. 7 to 9 of the drawings, a pin hole is to be drilled through the workpiece just to the rear of its forward flange and extending perpendicularly to and intersecting the longitudinal axis of the workpiece. Equipment similar to that illustrated in the noted figures may also be employed for subsequent reaming of the hole if desired. It is assumed that the face 52 of the front flange of the workpiece has been machined at an earlier operation at which locating means corresponding to stop buttons 106 and 108 have been employed.

When the pallet 18 has been moved to the portion of the machine illustrated in Fig. 6, it is located and clamped and the driving couplers are engaged to connect the rotating driving means 70, 72, 74 and 76 to the spindles within the four illustrated housings 34, 36, 38 and 40. As before noted, at this portion of machine, no cam rail is provided so that the driving means 70 to 76 act as positioners, rotating the spindles only until the locking plungers, such as locking plunger 82, are aligned with and drop into engagement with the provided recesses, at which time the workpieces are locked against rotation for the duration of the machine operations performed at this section of the machine tool.

The multiple-spindle tool head 200 at the portion of the machine tool illustrated in Fig. 6 includes a plurality of drills, such as drill 202 (Fig. 7) supported by individual spindles, such as spindle 204, and means for rotating the drills about their longitudinal axes and for moving the drills in translation along their longitudinal axes.

It is assumed that the pin hole must be very accurately located both transversely and longitudinally of the workpiece. Since a plurality of the surfaces of the workpiece have been precisely machined in prior operations, any of those may be employed as reference surfaces in the present operation. Accordingly, the forward face 52 of the front flange of the workpiece 16 (Fig. 7) is representatively employed as a reference surface to adjust the position of the drill 202 along the longitudinal axis of the workpiece, and the cylindrical surface 60 is employed as a reference surface to adjust the drill 202 so that its axis intersects the longitudinal axis of the workpiece. While all of the drills may be adjusted as a unit relative to the four workpieces, improved accuracy may be obtained by providing for individual adjustment of each drill with respect to the individual workpieces, and such an arrangement is representatively disclosed. In view of the accuracy with which the workpieces are located upon the pallet 18 and the accuracy with which the pallet is located, the magnitude of the adjustments is, of course, quite small.

Both of the requisite adjustments are performed through the provision of a plurality of positioning means in the form of bushing plates, such as bushing plate 206 illustrated in Figs. 7 and 9 of the drawings. A centrally apertured bracket 208 is screwed or otherwise secured in fixed relation to the left-hand face (Fig. 7) of the bushing plate 206, with the aperture therein in accurate vertical alignment with an aperture in an upper overhanging portion 210 of the bushing plate 206. A drill-guiding bushing 212 is nonrotatably secured in bracket 208, the lower end of bushing 212 extending into proximity to the lower inner surface of the workpiece 16 so as to accurately guide the drill 202 in the formation of the hole through the lower portion of the workpiece. A headed liner bushing 214, secured within the aperture in the overhanging portion 210 of the plate 206 accepts and guides an upper drill-guiding bushing 216. Drill bushing 216 is vertically slidable within liner bushing 214 from an upper position in which its lower end is above the level of the front flange of the workpiece 16 to the illustrated position in which its lower end is proximate the upper portion of the workpiece 16. The drill 202 is rotated about its axis and is movable vertically along its axis relative to the bushings 216 and 212.

Each of the plurality of bushing plates, such as bushing plate 206, is supported by the upstanding portion 220 of a bushing-plate slide 222, the method of interconnection between each of the bushing plates and the slide being such that each bushing plate can move in any of four horizontal directions relative to the slide 222 but cannot move vertically relative to that slide. A key 226 seated in a horizontal slot in the forward face of portion 220 of slide 222 engages a keyway 228 (Fig. 7) extending the full width of the bushing plate 206. Plate 206 can move relative to key 226 away and toward the portion 220 and can move transversely of portion 220, but key 226 prevents plate 206 from moving vertically relative to portion 220 and, importantly, prevents any relative rotation between plate 206 and slide 222.

Bushing plate 206 is continuously urged away from portion 220 of slide 222 by means acting between those parts, four such means 230, 232, 234 and 236 representatively being shown in Fig. 9 of the drawings. As may best be seen in the sectional view of Fig. 7 of the drawings, means 230 comprises a compression spring 238 acting between the seat of a recess 240 formed in the portion 220 of slide 222 and a cup 242 abutting the right-hand face of the bushing plate 206. Cup 242 fits within the aperture in the portion 220 and is slidable with respect thereto, the limits of that sliding motion being established by abutment between either face of the lip 244 on the cup 242 and surfaces 246 and 248 formed by enlarging the diameter of the recess 240 over a portion of its length. If cup 242 is secured to the bushing plate 206, the recess 240 should be oversize or horizontally elongated to permit bushing plate 206 to move laterally with respect to portion 220. Alternatively, cup 242 may merely abut the right-hand face of plate 206 on to the forces exerted by spring 238, plate 206 sliding upon and relative to the cup 242 during horizontal motion of the plate 206 relative to the portion 220. The other means 232, 234 and 236 may be similarly constructed.

To limit the extent to which bushing plate 206 may move away from portion 220, a stud 250, extending through an aperture in the portion 220 of the slide 222, is threaded, as at 252, or otherwise secured to the bushing plate 206. A headed spacer 254 is held upon stud 250 by nut 256, spacer 254 abutting a shoulder on the stud 250 to establish its position. When the bushing plate 206 is spaced from the workpiece 16, the spring means will force the bushing plate away from the portion 220 until the left-hand face (Fig. 7) of spacer 254 abuts a seat 258 established by counterboring the aperture in portion 220. Since stud 250 is rigidly secured to bushing plate 206 and since bushing plate 206 must be free to move laterally with respect to portion 220, it will be apparent that the aperture and counterbore in portion 220 through which stud 250 extends must either be oversize or horizontally elongated. An additional stop means 260 similar in construction to the stop means including stud 250 may be provided if desired as is indicated in Fig. 9 of the drawings.

To establish the desired relationship between the face of the workpiece 16 and the bushing plate 206 and parts carried thereby, a plurality, representatively four, locating or rest buttons 262, 264, 266 and 268 (Fig. 9) are mounted upon the plate 206 in any suitable fashion. These rest buttons are desirably ground, after assembly, so that their surfaces lie in a common plane. If desired, air may be flowed through longitudinal apertures in the rest buttons to insure that residue or particles will not become lodged between the rest buttons and the face of the workpiece.

A centering plate 272, serving with the bushing plate as a position-sensing means, is accurately secured to the face of the bushing plate 206 by any suitable means, such as by dowels 274 and 276 (Fig. 9) and by socket head screws, such as screw 278. Portions 280 and 282 of centering plate 272 are formed to a diameter substantially equal to that of the surface 60 (Fig. 7) of the workpiece 16, while the remainder of the periphery of the generally circular centering plate 272 is formed to a somewhat smaller diameter so that the upper and lower edges of the plate will not abut that cylindrical surface 60. The leading edges of the portions 280 and 282 are chamfered to cam the bushing plate into proper relationship with the workpiece when those parts are brought together in a manner to be described.

Means are provided for moving the slide 222, and parts carried thereby, toward and away from the workpieces and additional means are provided for lowering each of the upper bushings 216 to the positions illustrated in Figs. 7 and 9 of the drawings. As may best be seen in Fig. 8 of the drawings, slide 222 moves upon ways including way 286 supported upon a base 288 which is fixed in position with respect to base 10. A bracket 290, secured upon the base 288, carries a hydraulic cylinder 292 the piston rod 294 of which is secured in any suitable fashion to the upstanding portion 220 of the slide 222.

Preparatory to the arrival of the workpiece-carrying pallet 18, at this portion of the machine tool, the drills 202 are fully retracted, the upper bushings 216 are in their uppermost positions and the piston rod 294 of the cylinder 292 is retracted. Consequently, all of the bushing plates, and the parts supported thereby, are in a position clear of the arriving workpieces. Under this condition, bushing plate 206 will be at its maximum spacing from the upstanding portion 220, as established by the stop means, and the other bushings will be similarly spaced a maximum distance from the portion 220.

When the workpiece-carrying pallet 18 has arrived at this portion of the machine tool and has been clamped in place, hydraulic cylinder 292 is actuated to move slide 222 and the bushing plates carried thereby to the left toward the several workpieces and in a direction perpendicular to the axes of rotation of the drills. During the course of this motion, the rest buttons on each of the bushing plates, such as rest buttons 262 to 268 on bushing plate 206, will strike the machined faces 52 of the workpieces 16. The stroke of hydraulic cylinder 292 is sufficient so that upstanding portion 220 will continue to travel a short distance to the left, and during that overtravel the space between each bushing plate 206 and the upstanding portion 220 will be reduced, with the flange 244 on each spring cup 242 separating from the surface 248 of the portion 220, with each bushing plate slot 228 becoming further engaged with the keys 226, and with the spacers such as spacer 254 becoming spaced from the surface 258 on the portion 220.

The stroke of hydraulic cylinder 292 is, of course, selected so that portion 220 will stop before it comes into abutment with the right-hand face of any one of the bushing plates, and stop means may be provided to affirmatively limit the travel if desired. In practice, the maximum overtravel after the rest buttons strike the workpiece need be but a few thousandths of an inch or less. It will be appreciated that the spacing between any bushing plate and the upstanding portion 220 may differ from the spacing between other bushing plates and the portion 220.

During the course of the motion of the bushing plate 206 toward the workpiece 16, the centering plate 272 will enter the workpiece and the chamfered portions 280 and 282 thereon will engage the cylindrical surface 60. If the axis of the centering plate 272 does not exactly coincide with the longitudinal axis of the workpiece, the bushing plate 206 will accordingly be shifted laterally, with reference to the upstanding portion 220 of the slide 222, in a direction perpendicular both to the longitudinal axis of the workpiece and to the longitudinal axis of the drill.

By virtue of these operations, the longitudinal axis of the bushings 216 and 212 is positioned to intersect the longitudinal axis of the workpiece and the distance between the longitudinal axis of the pin holes to be drilled and the face 52 of the workpiece is accurately and precisely established.

A pair of brackets 300 and 302 (Fig. 6) secured to slide 222 support a hydraulic cylinder 304 upon trunnions 306 (Fig. 8) so that cylinder 304 may rock upon the axis of the trunnions. Piston rod 308 of cylinder 304 is secured to a plate 310 rotatably pinned to a link 312 which is keyed to a shaft 314. Shaft 314 extends the width of head 200 (Fig. 6) and is rotatably supported by means including end bracket 316 (Figs. 7 and 8), supported upon slide 222.

A clevis arm, such as clevis arm 320, is keyed to the shaft 314 at a point overlying each of the bushing plates. A rocker block 322, having a longitudinal slot 324 in each of the two side faces thereof, is positioned between the bifurcations of the clevis arm 320. A pin 326 is secured in an aperture in bifurcation 328 of arm 320 and extends into the slot 324, and a similar pin is supported by the other bifurcation of the arm 320 and enters the other slot in the rocker block 322. The upper bushing 216 is inserted and clamped in a central aperture in the rocker block 322.

After the bushing plate is brought into engagement with the workpiece, hydraulic cylinder 304 is actuated to rotate shaft 314 in a counterclockwise direction (Figs. 7 and 8) to accordingly rotate each of the several clevis arms, such as arm 320. Bushing 216 must move rectilinearly in view of its engagement with sleeve 214 and rocker 322 serves to convert the rotational motion of arm 320 into translational motion of bushing 216 since rocker 322 can rotate about the axis of the aligned pins including pin 326 and since those pins can slide longitudinally of the rocker 322 during the course of the arcuate motion of arm 320. In this manner, the upper bushing 216 is brought to the position illustrated in Fig. 7 and the drilling operation is thereafter performed. It will be observed that the drill head can either be carried by the slide 222 or can be fixed in its horizontal position, in which case the drills must, of course, be fully withdrawn from the bushings whenever slide 222 is not in its full forward position. At the completion of the drilling operation, drill 202 is retracted and piston rod 308 (Fig. 8) of hydraulic cylinder 304 is also retracted to rotate each of the clevis arms including arm 320 in a clockwise direction (Fig. 7) to move the upper bushing 216 above the flange of the workpiece. Hydraulic cylinder 292 may thereafter be actuated to move the slide 222, and all parts carried thereby, to the right in the views of Figs. 7 and 8 in preparation for the removal of the pallet 18 and for the arrival of another workpiece-supporting pallet.

While it will be apparent that the embodiment of the invention is susceptible to modification, variation and objects of the invention, it will be appreciated that the invention is susceptible to modification, variation and change without departing from the proper scope or fair meaning of the subjoined claims.

What is claimed is:
1. In a machine tool including a plurality of work stations at which work operations are performed upon a workpiece, one of the work stations including a cutting tool; the combination of a workpiece-supporting pallet movable to the several work stations; and means effective after said pallet has been moved to said one work station and prior to engagement of the cutting tool with the workpiece for establishing a precise positional relationship between the cutting tool and the workpiece comprising a slide, driving means for moving said slide towards the workpiece, positioning means for positioning the cutting tool, means supporting said positioning means on said slide for movement with respect to said slide both in a direction perpendicular to and in a direction parallel with the direction of movement of said slide, a first surface on said positioning means engageable with a first surface fixed with respect to the workpiece as said positioning means is moved by said slide towards the workpiece, one of said first surfaces being inclined with respect to the line of movement of said slide so that said positioning means is cammed into movement relative to said slide and in a direction perpendicular to the direction of movement of said slide, and a second surface on said positioning means engageable with a second surface fixed with respect to the workpiece as said positioning means is moved by said slide towards the workpiece for preventing further movement of said positioning means towards the workpiece during any further movement of said slide towards the workpiece.

2. A machine tool comprising a series of in-line work stations; horizontal rail means extending through said work stations; a work supporting pallet movable successively from station to station on said rail means adapted to carry a workpiece in a fixed, predetermined position thereon; locating means for said pallet in at least one of said stations comprising means for locating the pallet horizontally in a direction parallel to its direction of travel on said rail means; and separate means for locating the pallet horizontally in a direction at right angles to said direction of travel; a cutting tool in said one station; and means for locating said cutting tool relative to the adjusted position of said pallet comprising positioning means for positioning the tool to act on a workpiece carried by said pallet, drive means coactive with said positioning means to adjust the latter relative to said pallet, means forming a reference surface on and movable with said pallet, and sensing means on and movable with said positioning means engageable with said reference surface and operable thereby independently of said tool to actuate said drive means to adjust said positioning means as required to dispose said tool precisely for engagement with said workpiece.

3. A machine tool comprising a series of in-line work stations; horizontal rail means extending through said work stations; a work supporting pallet movable successively from station to station on said rail means adapted to carry a workpiece in a fixed predetermined position thereon; locating means for said pallet in at least one of said stations comprising means for locating the pallet horizontally in a direction parallel to its direction of travel on said rail means; separate means for locating the pallet horizontally in a direction at right angles to said direction of travel and operable simultaneously to clamp the pallet in both said located positions; a cutting tool in said one station; and means for locating said cutting tool relative to the adjusted position of said pallet comprising positioning means for positioning the tool to act on a workpiece carried by said pallet, drive means coactive with said positioning means to adjust the latter relative to said pallet, means forming a reference surface on and movable with said pallet, and sensing means on and movable with said positioning means engageable with said reference surface and operable thereby independently of said tool to actuate said drive means to adjust said positioning means as required to dispose said tool precisely for engagement with said workpiece.

4. A machine tool comprising a series of in-line work stations; horizontal rail means extending through said work stations; a work supporting pallet movable successively from station to station on said rail means adapted to carry a workpiece in a fixed, predetermined position thereon; locating means for said pallet in at least one of said stations comprising means for locating the pallet horizontally in a direction parallel to its direction of travel on said rail means, stop means at one side of said rail means, and means in said station engageable with said pallet to push the latter transversely of said rail means and against said stop means whereby to locate the same in a direction at right angles to said direction of travel and simultaneously to clamp the pallet in both of said located positions; a cutting tool in said one station; and means for locating said cutting tool relative to the adjusted position of said pallet comprising positioning means for positioning the tool to act on a workpiece carried by said pallet, drive means coactive with said positioning means to adjust the latter relative to said pallet, means forming a reference surface on and movable with said pallet, and sensing means on and movable with said positioning means engageable with said reference surface and operable thereby independently of said tool to actuate said drive means to adjust said positioning means as required to dispose said tool precisely for engagement with said workpiece.

5. In a machine tool including a plurality of work stations at which work operations are performed upon a workpiece, one of the work stations including a cutting tool; the combination of a workpiece-supporting pallet movable to the several work stations; and means effective after said pallet has been moved to said one work station and prior to engagement of the cutting tool with the workpiece for establishing a precise positional relationship between the cutting tool and the workpiece comprising a slide, driving means for moving said slide towards the workpiece, positioning means for positioning the cutting tool and movable with respect to said slide in a direction parallel with the direction of movement of said slide, means supporting said positioning means on said slide for movement with respect to said slide, and a surface on said positioning means independent of and apart from said tool engageable with a surface fixed with respect to and associated and movable with the workpiece as said positioning means is moved by said slide towards the workpiece for moving said positioning means relative to said slide.

6. In a machine tool including a plurality of work stations at which work operations are performed upon a workpiece, one of the work stations including a cutting tool; the combination of a workpiece-supporting pallet movable to the several work stations; and means effective after said pallet has been moved to said one work station and prior to engagement of the cutting tool with the workpiece for establishing a precise positional relationship between the cutting tool and the workpiece comprising a slide, driving means for moving said slide towards the workpiece, positioning means for positioning the cutting tool and movable with respect to said slide in a direction parallel with the direction of movement of said slide, means supporting said positioning means on said slide for movement with respect to said slide, and a surface on said positioning means independent of and apart from said tool engageable with a surface fixed with respect to and associated and movable with the workpiece as said positioning means is moved by said slide towards the workpiece for moving said positioning means relative to said slide, spring means for continuously exerting a force tending to move said positioning means away from said slide to a position spaced a preselected distance from said slide, said surfaces adapted to become engaged at a point in the movement of said slide toward the workpieces whereby the spacing between said positioning means and said slide is reduced.

7. In a machine tool including a plurality of work stations at which work operations are performed upon workpieces, one of the work stations including a plurality of cutting tools; the combination of a pallet movable to the several work stations and including means for concurrently supporting a plurality of workpieces in spaced parallelism with one another; and means effective after said pallet has been moved to said one work station and prior to engagement of the cutting tools with the workpieces for establishing a precise positional relationship between each of the plurality of cutting tools and individual ones of the plurality of workpieces comprising a slide, driving means for moving said slide in one direction towards the workpieces, positioning means individual to each of the cutting tools for positioning the cutting tool relative to the workpiece to which the cutting tool is individual, each of said positioning means being movable with respect to said slide in a direction parallel with the direction of movement of the slide, means supporting each of said positioning means on said slide for movement with respect to said slide, and a surface on each of said positioning means engageable with individual surfaces fixed with respect to the individual workpieces as said positioning means are moved by said slide towards the workpieces for moving each of said positioning means relative to said slide into proper positional relationship with the individual workpieces, the surface of each of said positioning means being engageable with a surface on an individual workpiece for preventing further movement of each of said positioning means toward the individual workpiece during further movement of said slide toward the workpiece.

References Cited in the file of this patent

UNITED STATES PATENTS

| | | |
|---|---|---|
| 2,058,438 | Perry | Oct. 27, 1936 |
| 2,085,397 | Strachan | June 29, 1937 |
| 2,193,840 | Oberhoffken et al. | Mar. 19, 1940 |
| 2,392,169 | Mansfield | Jan. 1, 1946 |
| 2,644,999 | Hill | July 14, 1953 |
| 2,690,702 | Romans et al. | Oct. 5, 1954 |
| 2,745,167 | Cross | May 15, 1956 |
| 2,779,040 | Scarff | Jan. 29, 1957 |

UNITED STATES PATENT OFFICE
CERTIFICATE OF CORRECTION

Patent No. 2,982,157                                          May 2, 1961

Ralph E. Cross et al.

It is hereby certified that error appears in the above numbered patent requiring correction and that the said Letters Patent should read as corrected below.

Column 5, line 43, for "adjutment" read -- adjustment --; column 10, line 51, for "is susceptible to modification, variation and" read -- herein disclosed is well calculated to fulfill the --.

Signed and sealed this 24th day of October 1961.

(SEAL)
Attest:

ERNEST W. SWIDER
Attesting Officer

DAVID L. LADD
Commissioner of Patents
USCOMM-DC